US009608965B2

(12) United States Patent
Sedayao (10) Patent No.: US 9,608,965 B2
(45) Date of Patent: *Mar. 28, 2017

(54) SECURE NETWORK REQUEST ANONYMIZATION

(71) Applicant: Intel Corporation, Santa Clara, CA (US)

(72) Inventor: Jeffrey C. Sedayao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/539,761

(22) Filed: Nov. 12, 2014

(65) Prior Publication Data

US 2016/0134592 A1    May 12, 2016

(51) Int. Cl.
*H04L 29/06* (2006.01)
(52) U.S. Cl.
CPC ...... *H04L 63/0421* (2013.01); *H04L 63/0281* (2013.01)
(58) Field of Classification Search
CPC ............. H04L 63/0421; H04L 63/0281; H04L 63/1425
See application file for complete search history.

(56) References Cited

U.S. PATENT DOCUMENTS

| | | |
|---|---|---|
| 2006/0023646 A1 | 2/2006 | George et al. |
| 2009/0131022 A1 | 5/2009 | Buckley et al. |
| 2012/0173664 A1 | 7/2012 | Kammerer et al. |
| 2013/0064073 A1 | 3/2013 | Cheng et al. |
| 2013/0246253 A1 | 9/2013 | Waelbroeck et al. |

OTHER PUBLICATIONS

Jeff Sedayao (Enhancing Cloud Security Using Data Anonymization, Jun. 2012, 8 pages).*
Reiter et al. (Crowds: Anonymity for Web Transactions, 1998, 23 pages).*
International Search Report and Written Opinion mailed Feb. 18, 2016 for International Application No. PCT/US2015/055356, 10 pages.

* cited by examiner

*Primary Examiner* — Oleg Korsak
(74) *Attorney, Agent, or Firm* — Schwabe, Williamson & Wyatt, P.C.

(57) ABSTRACT

Network request anonymizing nodes ("NRANs") may be described herein. The NRANs may act as anonymizing proxies by generating additional anonymizing network requests to help anonymize a network request sent by a requesting computing node. By generating the additional anonymizing network request, the NRANs may cause a relatively large number of similar network requests to be transmitted in an approximately contemporaneous fashion with the transmission of the network request. The NRANs may receive indication of network requests via a secure anonymization proxy tunnel, which may be established through transmission of an anonymizing proxy request from the requesting computing node to the NRANs. The secure anonymization proxy tunnel may be established between a secure enclave of the requesting computing node and secure enclaves of the NRANs. Other embodiments may be described and/or claimed.

22 Claims, 9 Drawing Sheets

Network request anonymizing system 200

Network request anonymizing system

SECURE NETWORK REQUEST ANONYMIZATION

TECHNICAL FIELD

The present disclosure relates to the field of data processing, in particular, to apparatuses, methods and storage media associated with anonymization of network requests.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Many computing systems utilize network-based resources, such as file servers, web servers, printers, and others in order to perform various activities, such as obtaining web pages, obtaining files, sending messages, printing documents, etc. However, many computing systems are utilized in scenarios, such as healthcare, banking, or finance, where information sent in network requests is sensitive. In particular, users of these systems may be concerned that a third-party may be able to intercept these network requests and from them obtain sensitive information and/or identify a user. For example, a third party listening in on communications sent from a particular device may be able to match identifying information for a user of the device with financial information sent from the device. This matching may allow the third party to steal the financial identity of the user, jeopardizing their financial security. Thus, network requests represent an area of security concern in many systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

Methods, apparatuses, systems, and computer-readable media are described herein for a network request anonymizing system ("NRAS") that may be composed of multiple network request anonymizing nodes ("NRANs"). In various embodiments, NRANs may be configured to act as anonymizing proxies by generating additional anonymizing network requests in order to help anonymize a network request sent by a requesting computing node. The NRANs may receive an indication of the network request sent by the requesting computing node and may generate the additional anonymizing network requests based on this identification. By generating the additional anonymizing network request, the NRANs may cause a relatively large number of similar network requests to be transmitted in an approximately contemporaneous fashion with the transmission of the network request sent by the requesting computing node. This larger number of network requests may serve to increase the difficulty of identifying which network request is the one that was needed and which were created by the NRANs. This usage of multiple requests may effectively increase anonymization of the network request sent by the requesting computing node.

The NRANs may receive indication of network requests via a secure anonymization proxy tunnel established between a requesting computing node and the NRANs. The secure anonymization proxy tunnel may be established through transmission of an anonymizing proxy request from the requesting computing node to the NRANs; this anonymizing proxy request may be sent directly by the requesting computing node and/or by NRANs that may forward the anonymization proxy request. The secure anonymization proxy tunnel may be established between a secure enclave of the requesting computing node and secure enclaves of the NRANs. Additionally, receipt of indications of network requests and generation of additional anonymizing network requests may also be performed within the secure enclaves of the NRANs. Secure enclaves may include logic executed in a secure portion of memory that may not be accessed by processes that are executed outside of that secure portion of memory.

Figure 1:
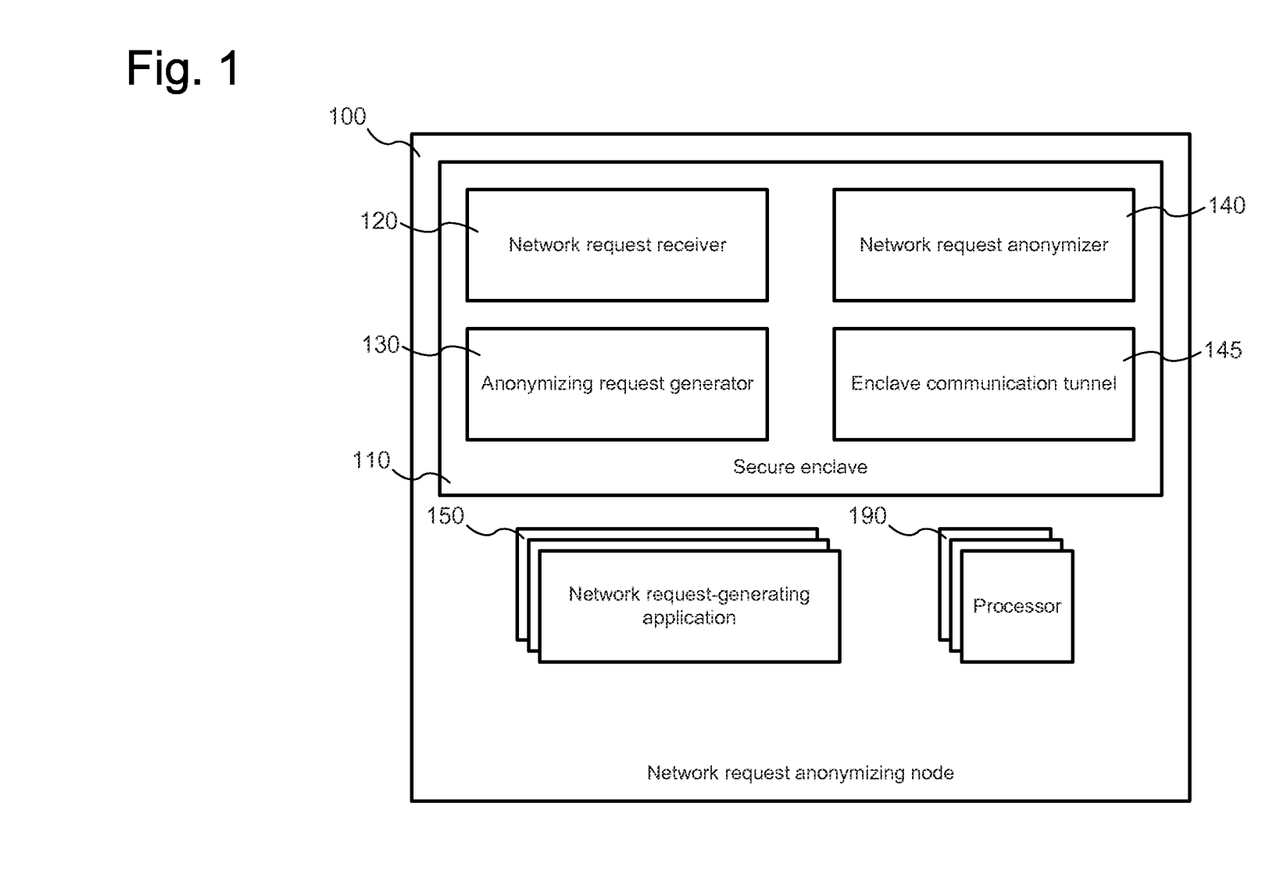
FIG. 1 illustrates an example arrangement for a network request anonymizing node configured to anonymize network requests, in accordance with various embodiments.

Referring now to FIG. 1, an example arrangement for a network request anonymizing node 100 ("NRAN 100") configured to anonymize network requests, in accordance with various embodiments. In various embodiments the NRAN 100 may be configured to receive indications of network requests and, in response, to generate and transmit additional anonymizing network requests. In various embodiments, the NRAN 100 may also be configured to transmit network request indications to other NRAN 100s when the NRAN 100 itself intends to transmit a network request and wants that network request to be anonymized. It may be noted that, while the term "NRAN" and "node" are used herein, the techniques described herein may be implemented on a variety of computing devices and systems, and are not limited to any particular computing device or architecture. For example, techniques described herein with relation to the "NRAN 100" may be performed by one or more of: a single computing device, multiple computing devices connected via wired and/or wireless connections, a single processor operating on a computing device, multiple processors running on a computing device, one or more cores of a processor, a cloud-distributed system, etc. Additionally, it maybe noted that the NRAN 100 is described below as both generating original network requests (for which anonymity is desired) as well as additional anonymizing network requests in order to help anonymize network requests sent by another node or computing system or device. However, in various embodiments, the NRAN 100 may be configured to perform only a subset of these activities, or to communicate with computing systems that perform only a subset of these activities.

In various embodiments, the NRAN 100 may include one or more modules, which may be alternatively implemented in hardware, software, firmware, or a combination thereof, to implement the techniques described herein. Additionally, while particular modules are illustrated in FIG. 1, in various embodiments the NRAN 100 may be configured to include additional modules, may combine or split apart illustrated modules, and/or may omit illustrated modules in their entirety. These modules may be configured to be operated on by one or more computing processors 190. In various embodiments, one or more modules of the NRAN 100 may be maintained and executed in a secure enclave 110. In various embodiments, the secure enclave 110 may be a protected portion of memory in which one or modules and/or processes may be executed without interference or inspection by other processes or modules on the NRAN 100 which are not executing in the secure enclave 110 (regardless of whether these modules and/or processes are executing using the same processors 190 as are used by the modules and/or processes in the secure enclave 110.) In various embodiments, the secure enclave may be inaccessible by most or all processes and/or modules that are not executed in the secure enclave 100; such processes and/or modules may include one or more operating system, kernel processes, networking processes, security processes, digital rights management processes and other processes and/or modules that might otherwise have access to other processes and modules. In various embodiments, the secure enclave may be implemented, and modules brought into the secure enclave for execution, using known techniques; these known techniques may include usage of Intel® Software Guard Extensions.

In various embodiments, the NRAN 100 may be configured to include a network request receiver 120 ("NRR 120") and/or an anonymizing request generator 130 ("ARG 130") which may be configured to facilitate anonymization of network requests that are sent (or to be sent) by other computing devices/systems. In various embodiments, the NRR 120 and/or the ARG 130 may be executed within the secure enclave 110. In various embodiments, the NRR 120 may be configured to receive one or more indications of network requests to be sent by other devices or systems (such as another NRAN 100, or a different computing device). In various embodiments, the NRR 120 may be configured to receive copies of network requests that are to be sent, or may be configured to receive information about a network request that is to be sent in another format. In various embodiments, the NRR 120 may be configured to receive information such as: network request type, network request origin system, network request destination, time of intended transmission, desired and/or required URL, origin system browser version, origin system operating system etc. In various embodiments, the ARG 130 may be configured to generate one or more additional anonymizing network requests to transmit in a roughly contemporaneous fashion with the network request for which an indication was received by the NRR 120. In various embodiments, the ARG 130 may be configured to generate additional anonymizing network requests that are substantially similar to the network request for which an indication was received. In various embodiments, one or more of the additional anonymizing network requests may be generated to be transmitted to the same destination (such as a web server) as that for the original network request. By sending multiple network requests to a same destination from multiple NRAN 100s, the NRAS may effectively anonymize which NRAN 100 (or other computing device or system) sent the "real" network request for which a response is needed. In other embodiments, the NRAN 100 may be configured to generate and transmit one or more additional anonymizing network request to destinations other than the destination identified in the received indication. In such embodiments, the identity of the destination may be effectively anonymized as well.

In various embodiments, the NRAN 100 may also be configured to include one or more modules configured to facilitate anonymization of network requests to be transmitted by the NRAN 100 itself, in concert with other separate NRAN 100s. In various embodiments, the NRAN 100 may be configured to include one or more network-request-generating applications 150 ("NGAs 150"), which may generate network requests to transmit as part of their activities. In various embodiments these NGAs 150 may include various traditional and non-traditional applications executing on the NRAN 100, including, but not limited to, web applications, email clients, file transfer applications, banking or financial applications, etc. In various embodiments, activities and techniques which may generate network requests may be understood by those of ordinary skill. In various embodiments, one or more of the NGAs 150 may execute outside of the secure enclave 110 as illustrated; in other embodiments, one or more of the NGAs 150 may execute within the secure enclave 110 (not illustrated).

In various embodiments, the NRAN 100 may also include a network request anonymizer 140 ("NRA 140"). The NRA 140 may be configured, in various embodiments, to send an indication of a network request generated by one of the NGAs 150 and to send and indication of the network request to other so the network request may be anonymized. The NRA 140 may also be configured, in various embodiments, to send one or more anonymizing proxy requests to other NRAN 100s to establish anonymizing proxy relationships between the various NRANs. The NRA 140 may also be configured to control transmission of a network request from an NGA 150 so that the network request may be sent contemporaneously with transmission of additional anonymizing network requests (in order to better protect the originator of the indication of the network request). In various embodiments, the NRA 140 may also be configured to receive anonymizing proxy requests from other NRAN 100s (or other computing devices) and to forward those requests to other NRAN 100s in order to increase the number of devices that may participate in anonymization of network requests. The NRA 140 may also be configured to send anonymizing proxy request to other NRAN 100s to establish anonymizing proxy relationships. In various embodiments, the one or more NRAN 100s may also include an enclave communication tunnel module 145 ("ET 145") which may be configured to set up anonymization proxy tunnels between secure enclaves 110 of different NRAN 100s. In various embodiments, the anonymization proxy tunnels may be secure, encrypted tunnels which may not be spied upon by other devices. Particular implementations of the anonymization proxy tunnels may be understood by those of ordinary skill and will not be belabored herein. Through use of these anonymization proxy tunnels, communication used for anonymization of network requests may be carried on between NRAN 100s without knowledge of spying devices.

Figure 2:
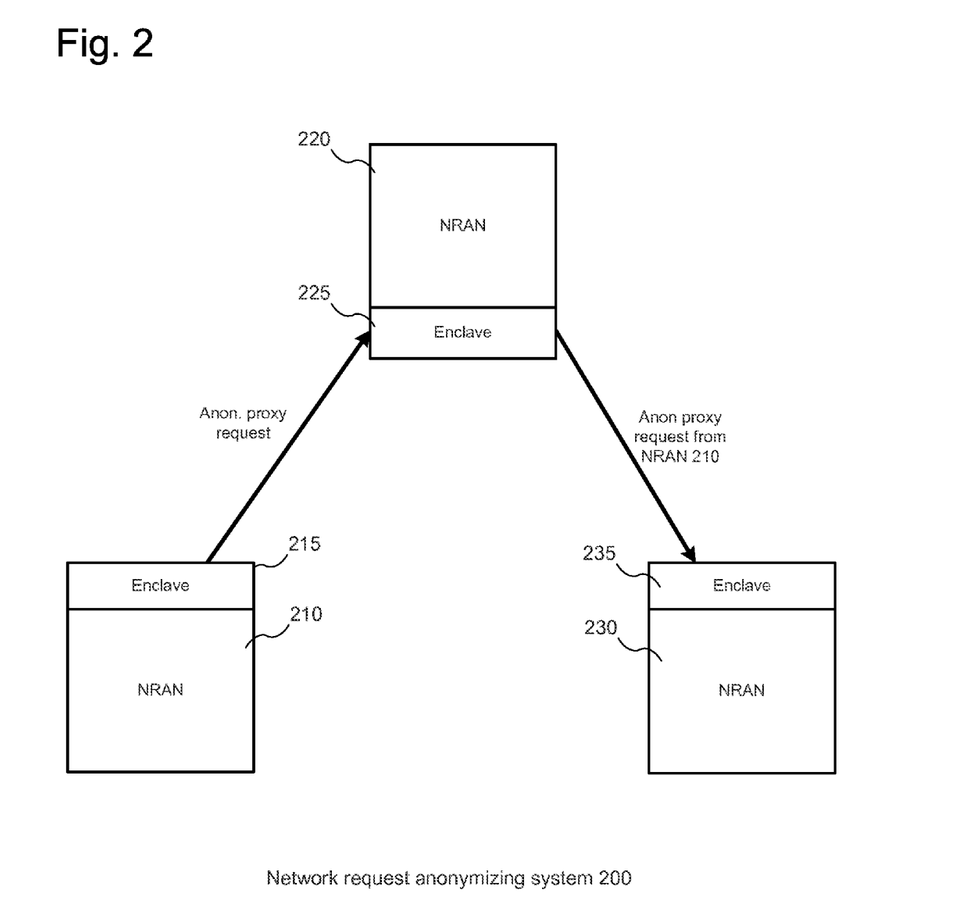
FIG. 2 illustrates example information flows between network request anonymizing nodes during sending of an anonymization proxy request, in accordance with various embodiments.

FIG. 2 illustrates example information flows between NRANs during sending of an anonymizing proxy request, in accordance with various embodiments. FIG. 2 (as well as FIGS. 3 and 4) illustrates an example NRAS 200 including example NRANs 210, 220, and 230, which may, in various embodiments, be connected through wired or wireless networking FIG. 2 also illustrates that each of NRANs 210, 220, and 230 includes respective secure enclaves 215, 225, and 235; these secure enclaves may be utilized, in various embodiments, for the communications between the NRANs for performance of the various anonymization techniques described herein. In the example illustrated in FIG. 2, NRAN 210 may be requesting establishment of anonymizing proxy relationships with NRANS 220 and 230. Thus, NRAN 210 may send an anonymizing proxy request from secure enclave 215 to secure enclave 225 of NRAN 220. In various embodiments, these requests may be sent from and to respective NRAs 140 in the respective secure enclaves 215 and 225. Additionally, in the example of FIG. 2, the anonymizing proxy request that was received by NRAN 220 is forwarded by that NRAN 220 to the NRNA 230 such that NRAN 210 and NRAN 230 may establish an anonymizing proxy relationship. In various embodiments, the anonymizing proxy request may be forwarded between NRANs so that the NRAN that is requesting establishment of the relationship (e.g. NRAN 210) does not have to directly send each anonymizing proxy request, as this network traffic may serve to identify the sending NRAN (e.g. NRAN 210) as needing anonymization.

Figure 3:
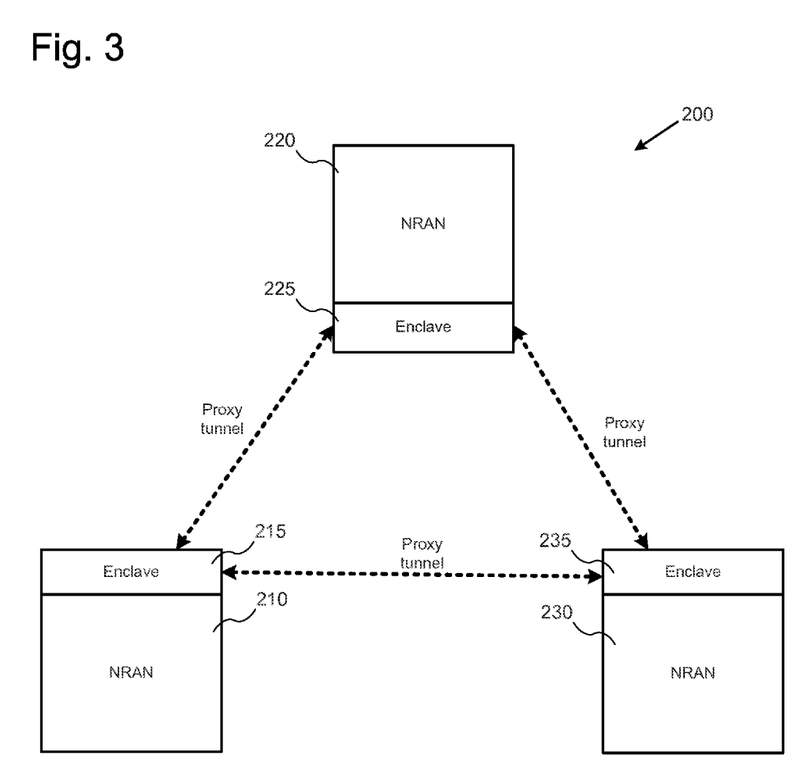
FIG. 3 illustrates example information flows between network request anonymizing nodes during establishment of secure anonymization proxy tunnels, in accordance with various embodiments.

FIG. 3 illustrates example information flows between NRANs (e.g. NRANs 210, 220, and 230) of the NRAS 200 during establishment of secure anonymizing proxy tunnels, in accordance with various embodiments. In the example illustrated in FIG. 3, an anonymizing proxy request has been sent from the NRAN 210 to the NRANs 220 and 230. In response to sending of this request, the NRANs (and specifically their respective ETs 145) may establish anonymizing proxy relationships between the NRANs. These anonymizing proxy relationships may include the use of anonymizing proxy tunnels, as discussed herein. Thus, in the example of FIG. 3, the NRANs 210 and 220 have established an anonymizing proxy relationship, with an attendant anonymizing proxy tunnel between the respective secure enclaves 215 and 225. Similarly, NRANs 210 and 230 have established an anonymizing proxy relationship, with an attendant anonymizing proxy tunnel between the respective secure enclaves 225 and 235. It may be noted that the anonymizing proxy relationship between NRANs 210 and 230 has been established despite the anonymizing proxy request not being sent directly between the two NRANs (as in FIG. 2). In various embodiments, the various NRAN 100s, and specifically their respective ETs 145, may directly communicate to establish the anonymizing proxy tunnels, as may be understood, regardless of whether an anonymizing proxy request was sent between the particular NRANs.

Figure 4:
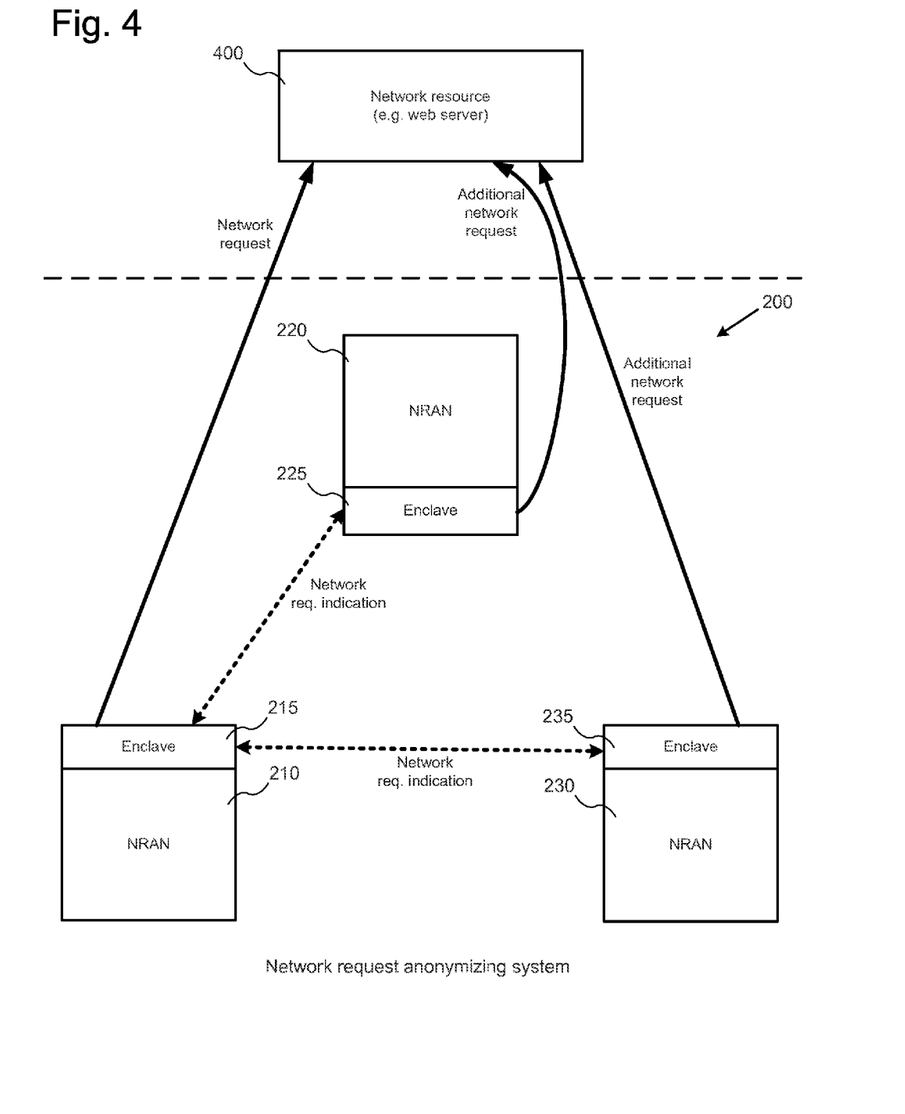
FIG. 4 illustrates example information flows between network request anonymizing nodes during anonymization of a network request, in accordance with various embodiments.

FIG. 4 illustrates example information flows between NRANs (e.g. NRANs 210, 220, and 230) of the NRAS 200 during anonymization of a network request, in accordance with various embodiments. In the example illustrated in FIG. 4, NRAN 110 desires to send a network request to network resource 400 (e.g. a web server). As illustrated in the example, NRAN 210 has sent an indication of the network request it wishes to send to the network resource 400. This indication may be sent to each of the other NRANS 220 and 230 (again, through the secure enclaves 215, 225, and 235). These indications may be received by the NRR 120 of the various NRAN 100s. In response to receipt of this indication, the ARG 130 may send additional anonymizing network requests to network resource 400. These additional anonymizing network requests (from NRANs 220 and 230) may be sent roughly contemporaneously with the network request being sent by NRAN 210. Thus, if another computing device were to investigate the network traffic of the NRAS 200, it would not be clear which of the network requests being sent to network resource 400 is the "real" (i.e. originally intended) request and which were generated specifically for the purpose of anonymization. This opacity may effectively anonymize the network request sent by NRAN 210, protecting users of the NRAN 210 from spying.

Figure 5:
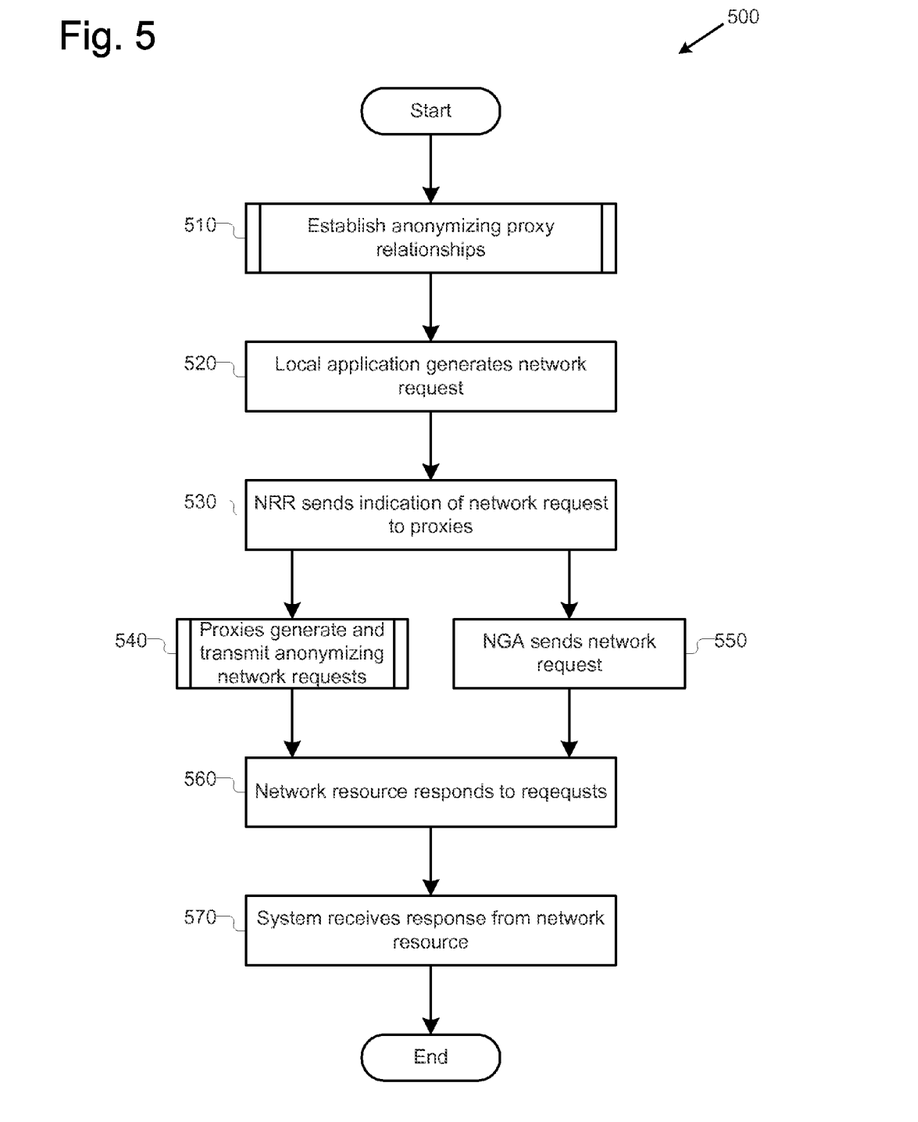
FIG. 5 illustrates an example process for anonymizing network requests, in accordance with various embodiments.

FIG. 5 illustrates an example process 500 for anonymizing network requests, in accordance with various embodiments. In various embodiments, NRAN 100s of the NRAS, as well as various modules of the NRAN 100s, may perform process 500. While particular operations and sub-processes are shown in a particular order, it may be recognized that, in various embodiments, the operations may be re-ordered, combined, split into additional operations or processes, and/or omitted altogether. The process may begin at operation 510, where NRAN 100s may establish anonymizing proxy relationships between the NRAN 100s. In various embodiments, this establishment of anonymizing proxy relationships may include the establishment of anonymizing proxy tunnels between the NRAN 100s. Particular implementations of operation 510 may be described below with relation to process 600 of FIG. 6. Next, at operation 520, one of the NGAs 150 of an NRAN 100 (hereinafter referred to as a "local NRAN 100") may generate a network request. As discussed above, in various embodiments this network request may include various types of network requests, including web page requests, requests for files, requests for online services, etc.

Next, at operation 530, the NRA 140 of the local NRAN 100 may send an indication of the network request to other NRAN 100s with which an anonymizing proxy relationship has been established (hereinafter the "proxy NRAN 100s"). As discussed above, in various embodiments, this indication may include a copy of the network request itself; in other embodiments, this indication may include information from the network request, such as the destination (e.g. the network resource to which the network request is to be sent), network request type, source of the request (e.g., the sending NRAN 100), etc. In various embodiments, the indication of the network request may be sent via the anonymizing proxy tunnels previously established at operation 510.

Next, at operations 540 and 550, network requests may be sent from the local NRAN 100 and the various proxy NRAN 100s of the NRAS. Thus, at operation 540, the proxy NRAN 100s may generate and transmit additional anonymizing proxy requests. In various embodiments, these additional anonymizing proxy requests may be sent to the original destination of the network request indicated at operation 530. In other embodiments, the additional anonymizing proxy requests may be sent to other destinations. Particular implementations of operation 540 may be described below with relation to process 700 of FIG. 7. At operation 550, the local NRAN 100 may also send its "real" network request to its destination. As discussed above, in various embodiments, operation 540 may occur contemporaneously with transmission of the additional anonymizing proxy requests at operation 540 such that the network request sent by the local NRAN 100 is not immediately identifiable out of the various network requests being sent by the proxy NRAN 100s. In some embodiments, the local NRAN 100 may be configured to delay transmission of the network request randomly or for a pre-determined amount of time such that it is contemporaneously transmitted along with the additional anonymizing proxy requests at operation 540.

Next, at operation 550, the network resource (e.g. network resource 400) may respond to the various network requests it has received. In various embodiments, many of these responses may be ignored by the various proxy NRAN 100s that receive the responses, as these responses are based on additional anonymizing proxy requests, and therefore the responses are unneeded. However, at operation 570, the local NRAN 100 may receive its response from the network resource 400 and may process the response. The process may then end.

Figure 6:
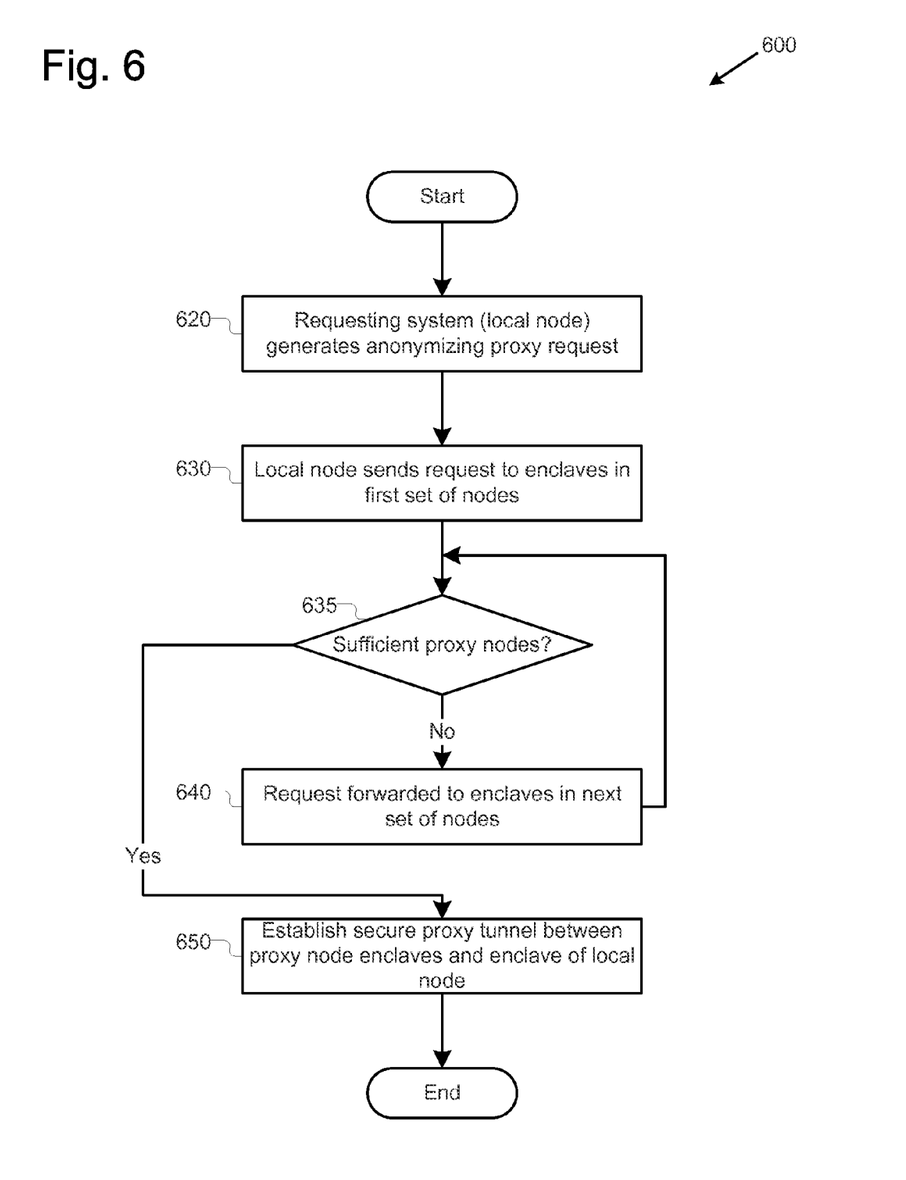
FIG. 6 illustrates an example process for establishing anonymizing proxy relationships, in accordance with various embodiments.

FIG. 6 illustrates an example process 600 for establishing anonymizing proxy relationships, in accordance with various embodiments. While particular operations and sub-processes are shown in a particular order, it may be recognized that, in various embodiments, the operations may be re-ordered, combined, split into additional operations or processes, and/or omitted altogether. The process may begin at operation 610, where the local NRAS 100, and specifically the NRA 140, may generate an anonymizing proxy request. In various embodiments, the anonymizing proxy request may include an indication of the identify of the local NRAS 100, as well as additional information usable to establish an anonymizing proxy tunnel, such as one or more encryption keys. Next, at operation 620, the local NRAN 100 (which is the NRAN 100 doing the requesting) may send the anonymizing proxy request to a NRA 140s in secure enclaves 110 of a first set of NRAN 100s. In various embodiments, this first set may be based on various criteria, including physical proximity to the local node, network topology, local node's current knowledge of which other NRANs exist, etc.

Next, at decision operation 635, the local NRAN 100 may determine whether anonymizing proxy NRAN 100s have been identified. In some embodiments, this determination may be based on a desired anonymization service level for the local NRAN 100. For example, if the local NRAN 100 (or a user of the local NRAN 100) desires to maintain a particular level of k-anonymity for a number k, that NRAN 100 (or user) may wish there to be a least k−1 proxy NRAN 100s for which additional anonymizing network requests may sent when the local NRAN 100 wishes to send a network request. In such a scenario, at decision operation 635, the local NRAN 100 may determine whether there are at least k−1 proxy NRANs 100 with which it has an anonymizing proxy relationship with. In other embodiments, other determinations and/or metrics may be utilized at decision operation 635. If there are insufficient proxy NRAN 100s, then the process may, at operation 640 have the anonymizing proxy request forwarded by secure enclave 110s of nodes in the first set of NRAN 100s to secure enclave 110s of other NRAN 100s. After this forwarding, then the process may repeat at decision operation 635, with more and more proxy NRAN 100s being added at each iteration until sufficient proxy NRAN 100s are found. Once, sufficient proxy NRAN 100s are found, then at operation 650, the local NRAN 100 may establish secure anonymizing proxy tunnels between the secure enclave 110s of each of the identified proxy NRAN 100s. As discussed above, establishment of secure tunnels may be understood by those of ordinary skill and will not be belabored further herein. After establishment of the anonymizing proxy tunnels, the process may then end.

Figure 7:
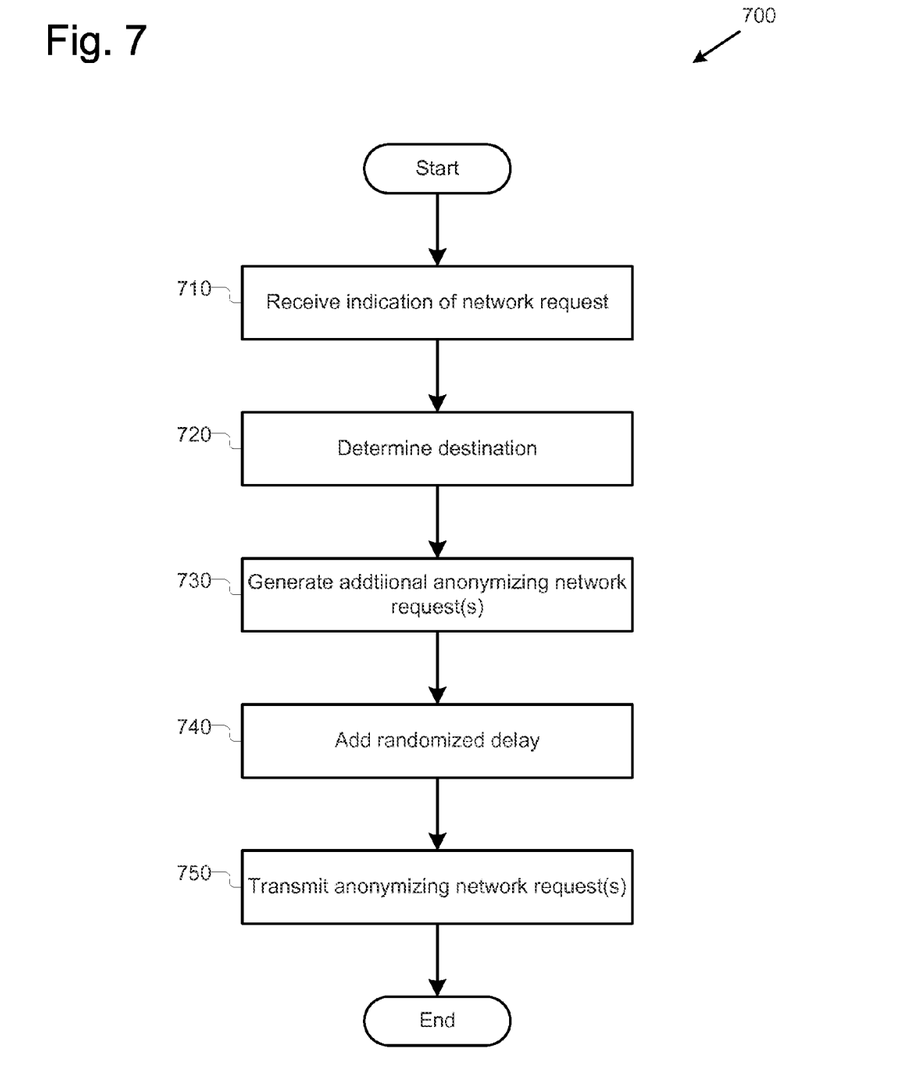
FIG. 7 illustrates an example process for an anonymization proxy to generate anonymizing network requests, in accordance with various embodiments.

FIG. 7 illustrates an example process 700 for a proxy NRAN 100 to generate anonymizing network requests, in accordance with various embodiments. While particular operations and sub-processes are shown in a particular order, it may be recognized that, in various embodiments, the operations may be re-ordered, combined, split into additional operations or processes, and/or omitted altogether. The process may begin at operation 710, where the proxy NRAN 100 may receive an indication of a network request at the NRR 120. Next, at operation 720, the NRR 120 may determine the destination of any additional anonymizing network requests to be generated. In various embodiments, as described above, this destination may be the same destination as that in the received indication, or may be one or more different destinations. Next, at operation 730, the ARG 130 may generate one or more additional anonymizing network request. In various embodiments, these generated additional anonymizing network requests may be substantially similar to the network request for which the indication was received at operation 710. Thus, in various embodiments, the additional anonymizing network requests may include a same or similar network request type as previously indicated, same or similar destination, same or similar origin, etc. Next, at operation 740, the ARG 130 may add a randomized delay for each of the one or more additional anonymizing network requests. In various embodiments, this randomized delay may help prevent a spying computing device from determining which network request is the originating request (e.g. sent by the local NRAN 100) or is sent by a proxy NRAN 100. In various embodiments, other, non-random delays may be introduced for additional anonymizing network requests and/or no delay at all may be introduced. Next, at operation 750, the proxy NRAN may transmit the additional anonymizing network request(s). The process may then end.

Figure 8:
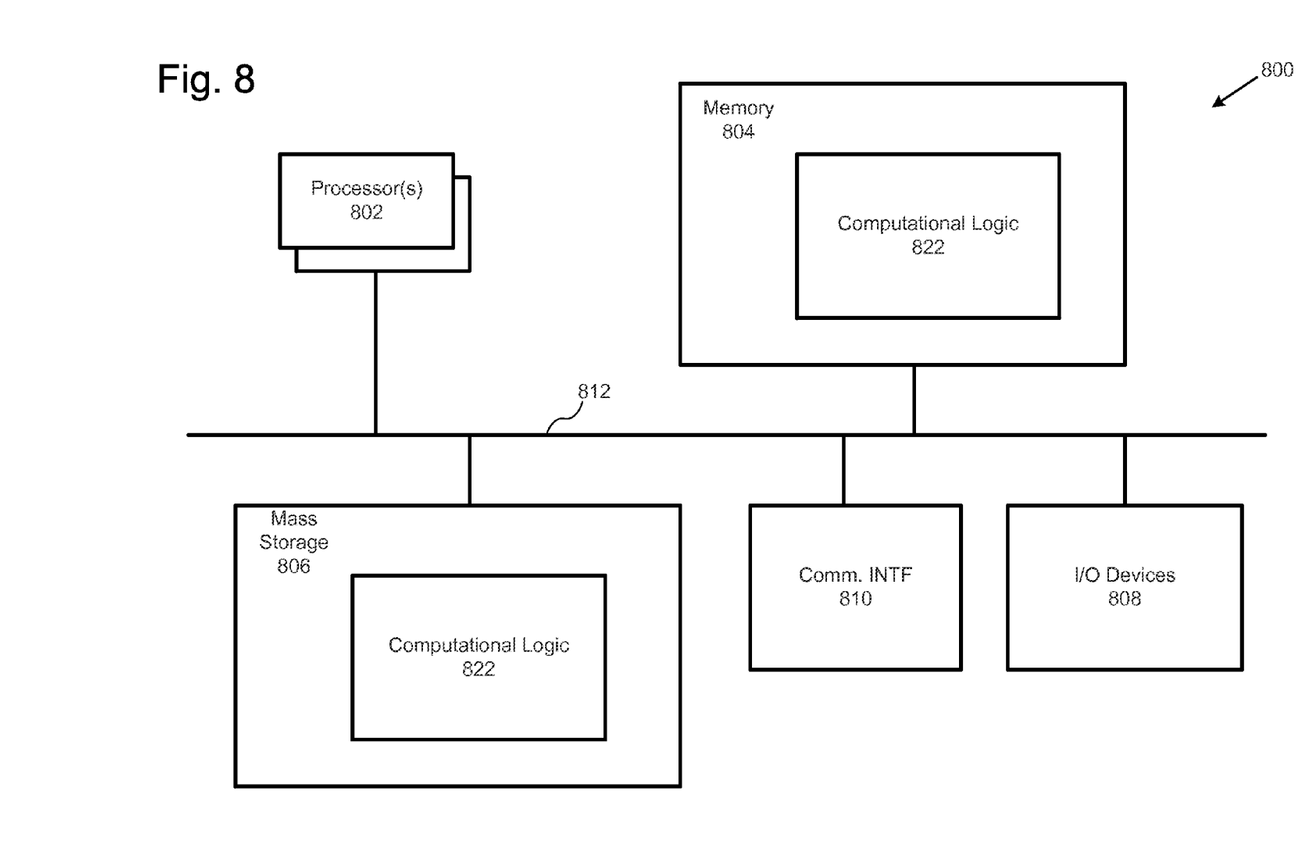
FIG. 8 illustrates an example computing environment suitable for practicing various aspects of the present disclosure in accordance with various embodiments.

Referring now to FIG. 8, an example computer suitable for practicing various aspects of the present disclosure, including processes of FIGS. 2-7, is illustrated in accordance with various embodiments. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control, remote control, gaming controller, image capture device, and so forth) and communication interfaces 810 (such as network interface cards, modems, infrared receivers, radio receivers (e.g., Bluetooth, WiFi, Near Field Communications, Radio-frequency identification, and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing one or more of the modules shown in FIG. 1 and/or the operations associated with techniques shown in FIGS. 2-7, collectively referred to as computing logic 822. The various elements may be implemented by assembler instructions supported by processor(s) 802 or high-level languages, such as, for example, C, that can be compiled into such instructions.

The permanent copy of the programming instructions may be placed into permanent storage devices 806 in the factory, or in the field, through, for example, a distribution medium (not shown), such as a compact disc (CD), or through communication interface 810 (from a distribution server (not shown)). That is, one or more distribution media having an implementation of the agent program may be employed to distribute the agent and program various computing devices. In embodiments, the programming instructions may be stored in one or more computer readable non-transitory storage media. In other embodiments, the programming instructions may be encoded in transitory storage media, such as signals.

The number, capability and/or capacity of these elements 810-812 may vary. Their constitutions are otherwise known, and accordingly will not be further described.

Figure 9:
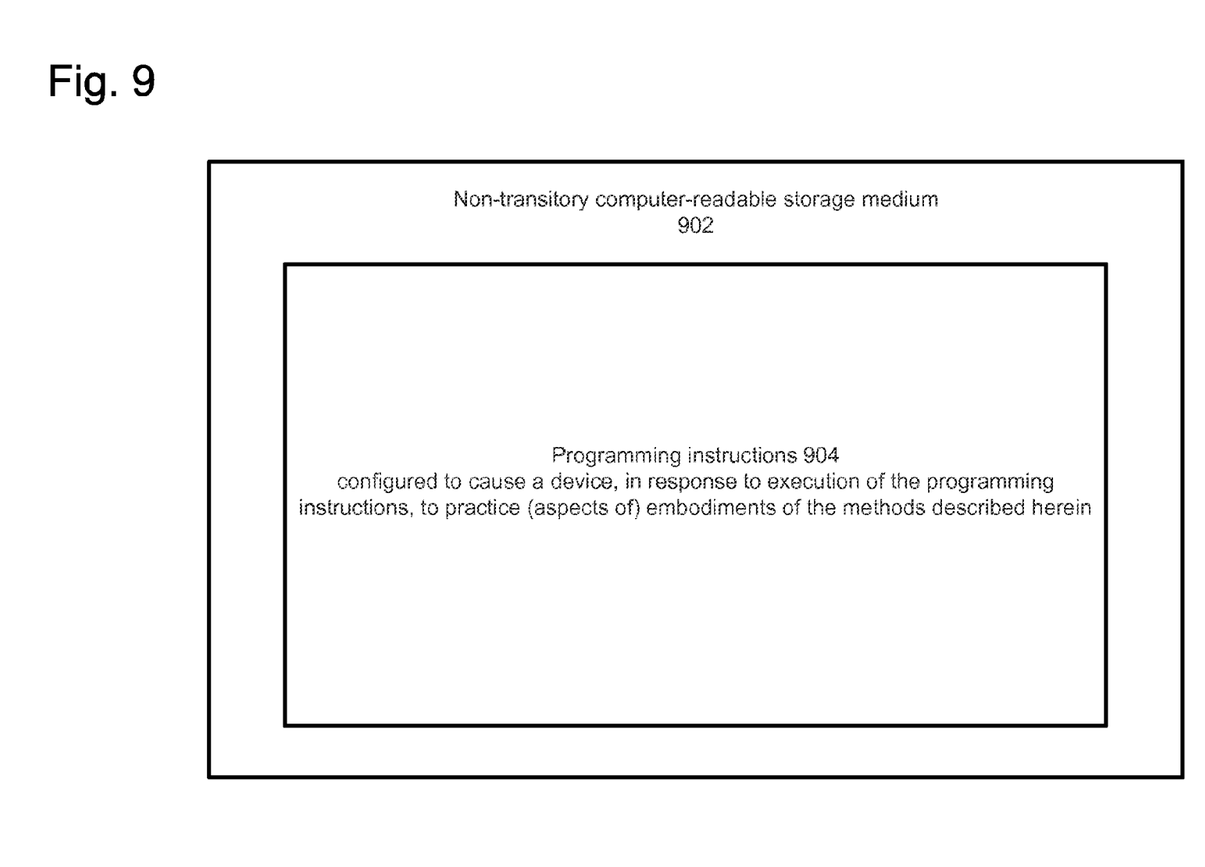
FIG. 9 illustrates an example storage medium with instructions configured to enable an apparatus to practice various aspects of the present disclosure in accordance with various embodiments.

FIG. 9 illustrates an example least one computer-readable storage medium 902 having instructions configured to practice all or selected ones of the operations associated with the techniques earlier described, in accordance with various embodiments. As illustrated, least one computer-readable storage medium 902 may include a number of programming instructions 904. Programming instructions 904 may be configured to enable a device, e.g., computer 800, in response to execution of the programming instructions, to perform, e.g., various operations of processes of FIGS. 2-7, e.g., but not limited to, to the various operations performed to perform anonymization of network requests. In alternate embodiments, programming instructions 904 may be disposed on multiple least one computer-readable storage media 902 instead.

Referring back to FIG. 8, for one embodiment, at least one of processors 802 may be packaged together with memory having computational logic 822 configured to practice aspects of processes of FIGS. 2-7. For one embodiment, at least one of processors 802 may be packaged together with memory having computational logic 822 configured to practice aspects of processes of FIGS. 2-7 to form a System in Package (SiP). For one embodiment, at least one of processors 802 may be integrated on the same die with memory having computational logic 822 configured to practice aspects of processes of FIGS. 2-7. For one embodiment, at least one of processors 802 may be packaged together with memory having computational logic 822 configured to practice aspects of processes of FIGS. 2-7 to form a System on Chip (SoC). For at least one embodiment, the SoC may be utilized in, e.g., but not limited to, a computing tablet. (e.g., WiFi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an anonymizing apparatus for anonymization of networking requests. The anonymizing apparatus may include one or more computer processors. The anonymizing apparatus may include a network request receiver which may be operated in a secure enclave of the apparatus by the one or more computer processors to receive an indication of a network request from a requesting computing node, the receipt indicating that anonymization is desired for the network request. The anonymizing apparatus may also include an anonymizing request generator to be operated in a secure enclave of the apparatus by the one or more computer processors to generate and transmit one or more additional anonymizing network requests to improve anonymity for transmission of the network request for which the indication was received.

Example 2 may include the anonymizing apparatus of example 1, wherein the anonymizing traffic generator may be to generate additional anonymizing network requests that are substantially similar to the network request for which an indication was received.

Example 3 may include the anonymizing apparatus of example 2, wherein the indication of the network request may include a destination for the network request and the anonymizing traffic generator may be to generate additional anonymizing network requests to be transmitted to the same destination.

Example 4 may include the anonymizing apparatus of any of examples 1-3, wherein the network request receiver may be to receive an indication of a network request that includes a copy of the network request.

Example 5 may include the anonymizing apparatus of any of examples 1-4, wherein the anonymizing traffic generator may be to transmit at least one of the one or more additional anonymizing network requests before transmission of the network request from the requesting computing node.

Example 6 may include the anonymizing apparatus of any of examples 1-5, wherein the anonymizing traffic generator may be to transmit at least one of the one or more additional anonymizing network requests after transmission of the network request from the requesting computing node.

Example 7 may include the anonymizing apparatus of any of examples 1-6, and may further include a network request anonymizer to be operated on by the one or more computing processors to identify a locally-generated network request to be sent from the anonymizing apparatus for which anonymization is desirable and to transmit an indication of the locally-generated network request to one or more other anonymizing apparatuses for the one or more other anonymizing apparatuses to generate substantially similar additional anonymizing network requests.

Example 8 may include the anonymizing apparatus of example 7, and may further include a network request transmitter to be operated on by the one or more computing processors to transmit the locally-generated network request.

Example 9 may include the anonymizing apparatus of example 8, wherein the network request transmitter may further be to transmit the locally-generated network request after transmission of at least one of the substantially similar additional anonymizing network requests from the one or more other anonymizing apparatuses.

Example 10 may include the anonymizing apparatus of example 7, wherein the network request anonymizer may be further to send anonymizing proxy requests to the one or more other anonymizing apparatuses to request that the one or more other anonymizing apparatuses prepare to generate substantially similar additional anonymizing network requests for future locally-generated network requests.

Example 11 may include the anonymizing apparatus of example 10, wherein the network request anonymizer maybe further to forward anonymizing proxy requests from a first other anonymizing apparatus to a second other anonymizing apparatus so that the second anonymizing apparatus can act as an anonymizing proxy for the first other anonymizing apparatus.

Example 12 may include the anonymizing apparatus of example 10, wherein the network request anonymizer may be further to send anonymizing proxy requests to the one or more other anonymizing apparatuses via one or more secure proxy tunnels.

Example 13 may include the anonymizing apparatus of any of examples 1-12, wherein the secure enclave may be to prevent access to memory used by the network request receiver and the anonymizing traffic generator by processes outside of the secure enclave.

Example 14 may include the anonymizing apparatus of any of examples 1-13, wherein the secure enclave may be to prevent access to processes used by the network request receiver and the anonymizing traffic generator by processes outside of the secure enclave.

Example 15 may include the anonymizing apparatus of any of examples 1-14, wherein the network request receiver may be to receive an indication of a network request via a secure proxy tunnel.

Example 16 may include a computer-implemented method for anonymization of networking requests. The method may include receiving, in a secure enclave of a computing system, an indication of a network request from a requesting computing node, the receiving indicating that anonymization is desired for the network request. The method may also include generating and transmitting, in the secure enclave of a computing system, one or more additional anonymizing network requests to improve anonymity for transmission of the network request for which the indication was received.

Example 17 may include the method of example 16, wherein generating additional anonymizing network requests may include generating additional anonymizing network requests that are substantially similar to the network request for which an indication was received.

Example 18 may include the method of example 17, wherein: the indication of the network request may include a destination for the network request; and generating additional anonymizing network requests may include generating additional anonymizing network requests to be transmitted to the same destination.

Example 19 may include the method of any of examples 16-18, wherein receiving an indication of a network request may include receiving a copy of the network request.

Example 20 may include the method of any of examples 16-19, wherein transmitting the one or more additional anonymizing network requests may include transmitting at least one of the one or more additional anonymizing network requests before transmission of the network request from the requesting computing node.

Example 21 may include the method of any of examples 16-20, wherein transmitting the one or more additional anonymizing network requests may include transmitting at least one of the one or more additional anonymizing network requests after transmission of the network request from the requesting computing node.

Example 22 may include the method of any of examples 16-21, and may further include: identifying, in the secure enclave of the computing system, a locally-generated network request to be sent from the computing system and for which anonymization is desirable; and transmitting, from the secure enclave of the computing system, an indication of the locally-generated network request to one or more anonymizing apparatuses for the one or more anonymizing apparatuses to generate substantially similar additional anonymizing network requests.

Example 23 may include the method of example 22, and may further include transmitting, by the computing system, the locally-generated network request.

Example 24 may include the method of example 23, wherein transmitting the locally-generated network request may include transmitting the locally-generated network request after transmission of at least one of the substantially similar additional anonymizing network requests from the one or more anonymizing apparatuses.

Example 25 may include the method of example 22, and may further include sending, from the secure enclave of the computing system, anonymizing proxy requests to the one or more anonymizing apparatuses to request that the one or more anonymizing apparatuses prepare to generate substantially similar additional anonymizing network requests for future locally-generated network requests.

Example 26 may include the method of example 25, and may further include forwarding an anonymizing proxy request from a first anonymizing apparatus to a second anonymizing apparatus so that the second anonymizing apparatus can act as an anonymizing proxy for the first anonymizing apparatus.

Example 27 may include the method of example 25, and may further include sending, from the secure enclave of the computing system, anonymizing proxy requests to the one or more anonymizing apparatuses via one or more secure proxy tunnels.

Example 28 may include the method of any of examples 16-27, and may further include preventing access, by the computing system, to memory used by the network request receiver and the anonymizing traffic generator by processes outside of the secure enclave.

Example 29 may include the method of any of examples 16-28, and may further include preventing access, by the computing system, to processes used by the network request receiver and the anonymizing traffic generator by processes outside of the secure enclave.

Example 30 may include the method of any of examples 16-29, wherein receiving an indication of a network request may include receiving an indication of a network request via a secure proxy tunnel.

Example 31 may include one or more computer-readable media including instructions written thereon that, in response to execution on a computing system, cause the computing system to anonymize of networking requests. The instructions may cause the computing system to receive, in a secure enclave of the computing system, an indication of a network request from a requesting computing node, the receiving indicating that anonymization is desired for the network request. The instructions may also cause the computing system to generate and transmit, in the secure enclave, one or more additional anonymizing network requests to improve anonymity for transmission of the network request for which the indication was received.

Example 32 may include the computer-readable media of example 31, wherein generate additional anonymizing network requests may include generate additional anonymizing network requests that are substantially similar to the network request for which an indication was received.

Example 33 may include the computer-readable media of example 32, wherein: the indication of the network request may include a destination for the network request; and generate additional anonymizing network requests may include generate additional anonymizing network requests to be transmitted to the same destination.

Example 34 may include the computer-readable media of any of examples 31-33, wherein receive an indication of a network request may include receive a copy of the network request.

Example 35 may include the computer-readable media of any of examples 31-34, wherein transmit the one or more additional anonymizing network requests may include transmit at least one of the one or more additional anonymizing network requests before transmission of the network request from the requesting computing node.

Example 36 may include the computer-readable media of any of examples 31-35, wherein transmit the one or more additional anonymizing network requests may include transmit at least one of the one or more additional anonymizing network requests after transmission of the network request from the requesting computing node.

Example 37 may include the computer-readable media of any of examples 31-36, wherein the instructions may be further to cause the computing system to: identify, in the secure enclave, a locally-generated network request to be sent from the computing system and for which anonymization is desirable and transmit, from the secure enclave, an indication of the locally-generated network request to one or more anonymizing apparatuses for the one or more anonymizing apparatuses to generate substantially similar additional anonymizing network requests.

Example 38 may include the computer-readable media of example 37, wherein the instructions may be further to cause the computing system to transmit the locally-generated network request.

Example 39 may include the computer-readable media of example 38, wherein transmit the locally-generated network request may include transmit the locally-generated network request after transmission of at least one of the substantially similar additional anonymizing network requests from the one or more anonymizing apparatuses.

Example 40 may include the computer-readable media of example 37, wherein the instructions may be further to cause the computing system to send, from the secure enclave, anonymizing proxy requests to the one or more anonymizing apparatuses to request that the one or more anonymizing apparatuses prepare to generate substantially similar additional anonymizing network requests for future locally-generated network requests.

Example 41 may include the computer-readable media of example 40, wherein the instructions may be further to cause the computing system to forward an anonymizing proxy request from a first anonymizing apparatus to a second anonymizing apparatus so that the second anonymizing apparatus can act as an anonymizing proxy for the first anonymizing apparatus.

Example 42 may include the computer-readable media of example 40, wherein the instructions may be further to cause the computing system to send, from the secure enclave, anonymizing proxy requests to the one or more anonymizing apparatuses via one or more secure proxy tunnels.

Example 43 may include the computer-readable media of any of examples 31-42, wherein the instructions may be further to cause the computing system to prevent access by the computing system to memory used by the network request receiver and the anonymizing traffic generator by processes outside of the secure enclave.

Example 44 may include the computer-readable media of any of examples 31-43, wherein the instructions may be further to cause the computing system to prevent access by the computing system to processes used by the network request receiver and the anonymizing traffic generator by processes outside of the secure enclave.

Example 45 may include the computer-readable media of any of examples 31-44, wherein receive an indication of a network request may include receive an indication of a network request via a secure proxy tunnel.

Example 46 may include an anonymizing apparatus for anonymization of networking requests. The apparatus may include means for receiving, in a secure enclave of the apparatus, an indication of a network request from a requesting computing node, the receiving indicating that anonymization is desired for the network request and means for generating and transmitting, in the secure enclave, one or more additional anonymizing network requests to improve anonymity for transmission of the network request for which the indication was received.

Example 47 may include the anonymizing apparatus of example 46, wherein means for generating additional anonymizing network requests may include means for generating additional anonymizing network requests that are substantially similar to the network request for which an indication was received.

Example 48 may include the anonymizing apparatus of example 47, wherein the indication of the network request may include a destination for the network request and means for generating additional anonymizing network requests may include means for generating additional anonymizing network requests to be transmitted to the same destination.

Example 49 may include the anonymizing apparatus of any of examples 46-48, wherein means for receiving an indication of a network request may include means for receiving a copy of the network request.

Example 50 may include the anonymizing apparatus of any of examples 46-49, wherein means for transmitting the one or more additional anonymizing network requests may include means for transmitting at least one of the one or more additional anonymizing network requests before transmission of the network request from the requesting computing node.

Example 51 may include the anonymizing apparatus of any of examples 46-50, wherein means for transmitting the one or more additional anonymizing network requests may include means for transmitting at least one of the one or more additional anonymizing network requests after transmission of the network request from the requesting computing node.

Example 52 may include the anonymizing apparatus of any of examples 46-51, and may further include means for identifying, in the secure enclave, a locally-generated network request to be sent from the anonymizing apparatus and for which anonymization is desirable and means for transmitting, from the secure enclave, an indication of the locally-generated network request to one or more other anonymizing apparatuses for the one or more other anonymizing apparatuses to generate substantially similar additional anonymizing network requests.

Example 53 may include the anonymizing apparatus of example 52, and may further include means for transmitting the locally-generated network request.

Example 54 may include the anonymizing apparatus of example 53, wherein means for transmitting the locally-generated network request may include means for transmitting the locally-generated network request after transmission of at least one of the substantially similar additional anonymizing network requests from the one or more other anonymizing apparatuses.

Example 55 may include the anonymizing apparatus of example 52, and may further include means for sending, from the secure enclave, anonymizing proxy requests to the one or more other anonymizing apparatuses to request that the one or more other anonymizing apparatuses prepare to generate substantially similar additional anonymizing network requests for future locally-generated network requests.

Example 56 may include the anonymizing apparatus of example 55, and may further include means for forwarding an anonymizing proxy request from a first other anonymizing apparatus to a second other anonymizing apparatus so that the second other anonymizing apparatus can act as an anonymizing proxy for the first other anonymizing apparatus.

Example 57 may include the anonymizing apparatus of example 55, and may further include means for sending, from the secure enclave, anonymizing proxy requests to the one or more anonymizing apparatuses via one or more secure proxy tunnels.

Example 58 may include the anonymizing apparatus of any of examples 46-57, and may further include means for preventing access by the anonymizing apparatus to memory used by the network request receiver and the anonymizing traffic generator by processes outside of the secure enclave.

Example 59 may include the anonymizing apparatus of any of examples 46-58, and may further include means for preventing access by the anonymizing apparatus to processes used by the network request receiver and the anonymizing traffic generator by processes outside of the secure enclave.

Example 60 may include the anonymizing apparatus of any of examples 46-59, wherein means for receiving an indication of a network request may include means for receiving an indication of a network request via a secure proxy tunnel.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An anonymizing apparatus, comprising:
one or more computer processors;
a network request receiver to be operated in a secure enclave of the apparatus by the one or more computer processors to assist in anonymization of a network request, wherein the apparatus is located in a first computing node of a plurality of computing nodes, the network request is a network request to be transmitted from a requesting second computing node of the plurality of computing nodes to a third computing node of the plurality of computing nodes to request for the requesting second computing node, a network resource from the third computing node, and wherein to assist in the anonymization includes to:
receive an indication of the network request from the requesting second computing node, a receipt of the indication indicating that anonymization is desired for the network request; and
an anonymizing request generator to be operated in the secure enclave by the one or more computer processors to generate and transmit one or more additional anonymizing network requests to improve anonymity for transmission of the network request for which the indication was received.

2. The anonymizing apparatus of claim 1, wherein the anonymizing request generator is to generate additional anonymizing network requests that are substantially similar to the network request for which an indication was received.

3. The anonymizing apparatus of claim 2, wherein:
the indication of the network request includes a destination for the network request including the third computing node; and
the anonymizing request generator is to generate additional anonymizing network requests to be transmitted to the same destination.

4. The anonymizing apparatus of claim 1, wherein the network request receiver is to receive an indication of a network request that comprises a copy of the network request.

5. The anonymizing apparatus of claim 1, wherein the anonymizing request generator is to transmit at least one of the one or more additional anonymizing network requests before transmission of the network request from the requesting second computing node.

6. The anonymizing apparatus of claim 1, wherein the anonymizing request generator is to transmit at least one of the one or more additional anonymizing network requests after transmission of the network request from the requesting second computing node.

7. The anonymizing apparatus of claim 1, further comprising a network request anonymizer to be operated on by the one or more computer processors to:
identify a locally-generated network request to be sent from the anonymizing apparatus for which anonymization is desirable; and
transmit an indication of the locally-generated network request to one or more other anonymizing apparatuses for the one or more other anonymizing apparatuses to generate substantially similar additional anonymizing network requests.

8. The anonymizing apparatus of claim 7, further comprising a network request transmitter to be operated on by the one or more computer processors to transmit the locally-generated network request.

9. The anonymizing apparatus of claim 8, wherein the network request transmitter is to transmit the locally-generated network request after transmission of at least one of the substantially similar additional anonymizing network requests from the one or more other anonymizing apparatuses.

10. The anonymizing apparatus of claim 7, wherein the network request anonymizer is further to send anonymizing proxy requests to the one or more other anonymizing apparatuses to request that the one or more other anonymizing apparatuses prepare to generate substantially similar additional anonymizing network requests for future locally-generated network requests.

11. The anonymizing apparatus of claim 10, wherein the network request anonymizer is further to forward anonymizing proxy requests from a first other anonymizing apparatus to a second other anonymizing apparatus so that the second other anonymizing apparatus can act as an anonymizing proxy for the first other anonymizing apparatus.

12. The anonymizing apparatus of claim 10, wherein the network request anonymizer is further to send anonymizing proxy requests to the one or more other anonymizing apparatuses via one or more secure proxy tunnels.

13. The anonymizing apparatus of claim 1, wherein the secure enclave is to prevent access to memory or processes used by the network request receiver and the anonymizing request generator by processes outside of the secure enclave.

14. One or more computer-readable media comprising instructions written thereon that, in response to execution on a computing system, cause the computing system located in a first computing node of a plurality of nodes to:
receive, in a secure enclave of the computing system, an indication of a network request from a requesting computing node, a receipt of the indication indicating that anonymization is desired for the network request, wherein the network request is a network request originating from a second computing node to a third computing node for a network resource of the third computing node; and
generate and transmit, in the secure enclave, one or more additional anonymizing network requests to improve anonymity for transmission of the network request for which the indication was received.

15. The computer-readable media of claim 14, wherein to generate additional anonymizing network requests comprises to generate additional anonymizing network requests that are substantially similar to the network request for which an indication was received.

16. The computer-readable media of claim 15, wherein:
the indication of the network request includes a destination for the network request including the third computing node; and
to generate additional anonymizing network requests comprises to generate additional anonymizing network requests to be transmitted to the same destination.

17. The computer-readable media of claim 14, wherein the instructions are further to cause the computing system to:
identify, in the secure enclave, a locally-generated network request to be sent from the computing system and for which anonymization is desirable; and
transmit, from the secure enclave, an indication of the locally-generated network request to one or more anonymizing apparatuses for the one or more anonymizing apparatuses to generate substantially similar additional anonymizing network requests; and
transmit the locally-generated network request.

18. The computer-readable media of claim 17, wherein transmit the locally-generated network request comprises transmit the locally-generated network request after transmission of at least one of the substantially similar additional anonymizing network requests from the one or more anonymizing apparatuses.

19. The computer-readable media of claim 18, wherein the instructions are further to cause the computing system to send, from the secure enclave, anonymizing proxy requests to the one or more anonymizing apparatuses to request that the one or more anonymizing apparatuses prepare to generate substantially similar additional anonymizing network requests for future locally-generated network requests.

20. A computer-implemented method, comprising:
receiving, in a secure enclave of a computing system located in a first computing node of a plurality of nodes, an indication of a network request from a requesting computing node, the receiving indicating that anonymization is desired for the network request, wherein the network request includes a request originated by a second computing node for a network resource in a third computing node; and
generating and transmitting, in the secure enclave of the computing system, one or more additional anonymizing network requests to improve anonymity for transmission of the network request for which the indication was received.

21. The method of claim 20, wherein generating additional anonymizing network requests comprises generating additional anonymizing network requests that are substantially similar to the network request for which an indication was received.

22. The method of claim 21, wherein:
the indication of the network request includes a destination for the network request including the third computing node; and
generating additional anonymizing network requests comprises generating additional anonymizing network requests to be transmitted to the same destination.

* * * * *